US009829377B2

(12) United States Patent
Steadman Booker et al.

(10) Patent No.: US 9,829,377 B2
(45) Date of Patent: Nov. 28, 2017

(54) DETECTION DEVICE HAVING A FEEDBACK DISCHARGE CONTROL UNIT FOR DETECTING PHOTONS AND METHOD THEREFORE

(71) Applicant: KONINKLIJKE PHILIPS N.V., Eindhoven (NL)

(72) Inventors: Roger Steadman Booker, Aachen (DE); Christoph Herrmann, Aachen (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 49 days.

(21) Appl. No.: 15/036,538

(22) PCT Filed: Nov. 7, 2014

(86) PCT No.: PCT/EP2014/073994
§ 371 (c)(1),
(2) Date: May 13, 2016

(87) PCT Pub. No.: WO2015/078681
PCT Pub. Date: Jun. 4, 2015

(65) Prior Publication Data
US 2016/0299002 A1  Oct. 13, 2016

(30) Foreign Application Priority Data

Nov. 26, 2013 (EP) ..................... 13194442

(51) Int. Cl.
*G01T 1/17* (2006.01)
*G01J 1/44* (2006.01)
(52) U.S. Cl.
CPC ...... *G01J 1/44* (2013.01); *G01T 1/17* (2013.01); *G01J 2001/444* (2013.01)

(58) Field of Classification Search
CPC ................ G01J 1/44; G01J 1/42; G01T 1/17
(Continued)

(56) References Cited

U.S. PATENT DOCUMENTS

| 5,821,533 A | 10/1998 | Bingham et al. |
| 7,170,049 B2 | 1/2007 | Iwanczyk |

(Continued)

FOREIGN PATENT DOCUMENTS

WO    2009/019622    2/2009

OTHER PUBLICATIONS

Paul Seller et al: "Two approaches to hybrid x-ray pixel array readout", Proceedings of SPIE, vol. 377 4, Oct. 6, 1999.

(Continued)

*Primary Examiner* — Que T Le

(57) ABSTRACT

The present invention relates to a detection device (6) for detecting photons emitted by a radiation source (2) and capable of adjusting ballistic deficit. The detection device (6) comprises a pre-amplifying unit (11) (such as, e.g., a charge-sensitive amplifier), a shaping unit (60) comprising a feedback discharge unit (13, I) (such as, e.g., a feedback resistor or a feedback current source), and a feedback discharge control unit (50) coupled to the feedback discharge unit (13, I). The feedback discharge control unit (50) is adapted to, e.g., adjust a resistance of a feedback resistor (and/or to adjust the current value of the feedback current source) if an electrical pulse generated by the shaping unit (60) does not exceed at least one energy comparison value $(X_1, X_2, \ldots, X_N)$. The feedback discharge control unit (50) is adapted to not adjust the parameter of the feedback discharge unit (13, I) if the electrical pulse exceeds the at least one energy comparison value $(X_1, X_2, \ldots, X_N)$. By tuning the feedback resistor operating point (or the feedback (Continued)

current source operating point), the ballistic deficit can be adjusted to a predefined expected value.

15 Claims, 6 Drawing Sheets

(58) Field of Classification Search
USPC .......................................... 250/214 R, 363.04
See application file for complete search history.

(56) References Cited

U.S. PATENT DOCUMENTS

| | | | |
|---|---|---|---|
| 8,309,933 | B1 | 11/2012 | Wang |
| 8,350,221 | B2 | 1/2013 | Steadman Booker |
| 9,664,797 | B2 * | 5/2017 | Roessl .................... G01T 1/171 |
| 2006/0056576 | A1 | 3/2006 | Hoffman et al. |
| 2007/0158551 | A1 | 7/2007 | Audebert |
| 2008/0018505 | A1 | 1/2008 | Astley et al. |
| 2010/0329425 | A1 | 12/2010 | Guo |
| 2011/0012014 | A1 | 1/2011 | Livine |
| 2013/0223587 | A1 | 8/2013 | Moriyasu |

OTHER PUBLICATIONS

Britton, et al., "Characteristics of High-Rate Energy Spectroscopy Systems Using HPGe Coaxial Detectors and Time-Variant Filters", IEEE Transcations on Nuclear Science, vol. NS-31, No. 1, Feb. 1, 2984.

Gianluigi Geronimo et al: "ASIC with Multiple Energy Discrimination for High-Rate Photon Counting Applications", Nuclear Science Symposium Conference Record, 2006. IEEE, Piscataway, NJ, USA, Piscataway, NJ, USA, Oct. 1, 2006.

Goulding F S et al: "Ballistic Deficit Correction in Semiconductor Detector Spectrometers", IEEE Transactions on Nuclear Science, Service Center, New York, NY, US, vol. 35, No. 1, Feb. 1, 1988.

* cited by examiner

DETECTION DEVICE HAVING A FEEDBACK DISCHARGE CONTROL UNIT FOR DETECTING PHOTONS AND METHOD THEREFORE

CROSS REFERENCE TO RELATED APPLICATIONS

This application is the U.S. National Phase application under 35 U.S.C. §371 of International Application No. PCT/EP2014/073994, filed Nov. 7, 2014, published as WO 2015/078681 on Jun. 4, 2015, which claims the benefit of European Patent Application Number 13194442.3 filed Nov. 26, 2013. These applications are hereby incorporated by reference herein.

FIELD OF THE INVENTION

The invention relates to a detection device for detecting photons emitted by a radiation source and capable of adjusting ballistic deficit, to a system comprising a detection device and a radiation source radiating photons of a predetermined energy and capable of adjusting ballistic deficit, to a detection method for detecting photons emitted by a radiation source and capable of adjusting ballistic deficit, and to a calibration method capable of adjusting ballistic deficit.

BACKGROUND OF THE INVENTION

Photon-counting based spectral computer tomography (CT) makes use of direct converting material, e.g. CZT. The performance of CZT pixels can vary significantly across an array. Charge yield and transient response may differ to a great extent. These variations manifest themselves as a pixel gain inhomogeneity. Variations in transient response cause also gain differences due to ballistic deficit.

Today, energy calibration procedures are in place to resolve the relation between the application-specific integrated circuit (ASIC) threshold level and the energy of the impinging photons. The outcome of the energy calibration is an adjustment of the ASIC threshold(s) such that all pixels have the same effective energy threshold.

U.S. Pat. No. 8,350,221B2 discloses an apparatus for generating countable pulses from impinging x-ray in an imaging device, in particular in a computer tomograph, the apparatus comprising a pre-amplifying element adapted to convert a charge pulse generated by an impinging photon into an electrical signal and a shaping element having a feedback loop and adapted to convert the electrical signal into an electrical pulse, wherein a delay circuit is connected to the feedback loop such that a time during which the feedback loop collects charges of the electrical signal is extended in order to improve an amplitude of the electrical pulse at an output of the shaping element. Also disclosed are a corresponding imaging device and a corresponding method.

US20080018505A1 discloses an adaptive data acquisition circuit including an amplifier for amplifying electrical pulses generated by a detector responsive to energy incident at the detector. The adaptive data acquisition circuit also includes a counting circuit for counting amplified electrical pulses generated by the amplifier. In addition, the adaptive data acquisition circuit includes a digital logic circuit for determining a pulse parameter indicative of a pulse rate and an amount of energy present in the amplified electrical pulses and for generating a control signal responsive to the pulse parameter for controlling an operating parameter of the data acquisition circuit.

U.S. Pat. No. 8,309,933B1 discloses systems, devices, processes, and algorithms for adaptively filtering a signal output from a radiation detector and adaptively sampling the signal. A count rate of events detected by the radiation detector is estimated by a processing unit. An RC time constant of the filter and a sampling rate of an analog-to-digital converter are adjusted based on the estimated count rate. Events are continuously detected by the radiation detector and counted by the processing unit while the adjustable parameters (the RC time constant and the sampling rate) of the filter and the analog-to-digital converter are adjusted on the fly (in real time) to optimize an energy resolution of the detected events, while reducing degradation due to pile-up effects and improving efficiency of the analog-to-digital converter. The filter can be implemented through analog filters, digital filters, or a combination thereof.

US20060056576A1 discloses a method and system of counting and tagging radiation energy received by a radiation detector. The method and system are designed to dynamically control the sampling window or shaping time characteristics of a photon counting detector to accommodate variations of flux experienced by the detector so as to preserve optimum detector performance and prevent saturation during high flux conditions.

Conventional gain calibration however neglects pixel variations caused by differences in transient response. Variations due to transient response not only cause gain differences but may also affect the spectral linearity.

SUMMARY OF THE INVENTION

It is an object of the present invention to provide a detection device and a detection method for detecting photons emitted by a radiation source and capable of adjusting ballistic deficit, which allow for addressing differences in transient response. It is a further object of the present invention to provide a system, which comprises the detection device, as well as corresponding detection and calibration methods which are capable of adjusting ballistic deficit.

In a first aspect of the invention, there is provided a detection device for detecting photons emitted by a radiation source and capable of adjusting ballistic deficit, the detection device comprising a pre-amplifying unit adapted to convert a charge pulse generated by a photon into an electrical signal, and a shaping unit adapted to convert the electrical signal into an electrical pulse. The shaping unit comprises a feedback discharge unit. A parameter of the feedback discharge unit is adjustable. The detection device further comprises a feedback discharge control unit coupled to the feedback discharge unit. The feedback discharge control unit is adapted to adjust the parameter of the feedback discharge unit if the electrical pulse does not exceed at least one energy comparison value. The feedback discharge control unit is adapted to not adjust the parameter of the feedback discharge unit if the electrical pulse exceeds the at least one energy comparison value.

A key idea of this invention is to tune the ASIC operating point per pixel in order to adjust the ballistic deficit to a predefined expected value such that the spread of photo peak amplitudes across the pixel matrix is already corrected to some extent. Preferably, the feedback discharge unit comprises a feedback resistor. The feedback resistor on a typical shaper implementation is responsible for the ballistic deficit.

It is proposed to adjust the value of this resistor by iteratively evaluating if the shaper amplitude is sufficiently high to cause a comparator to trip, which is set to a predefined value corresponding to the expected position of the photo-peak in the energy domain. The invention may thus be used as the initial factory calibration to determine the particular per-pixel ASIC parameter configuration that fits best with the characteristics of the (permanently) mounted crystal. For routine use of the detector, threshold calibrations using threshold scans would be applied.

Ballistic Deficit is unavoidable in order to achieve high count rates. The emphasis of the present invention resides on the fact that the ballistic deficit channel-to-channel might be different because the sensor pixels may have different responses. Thus, the intention is to "equalize" the ballistic deficit across pixels.

In a preferred embodiment of the invention, the detection device further comprises a feedback capacitor, which is coupled in parallel to the feedback discharge unit. When a current transient (or current pulse) occurs (or step response if using a preamplifier), the corresponding charge is transferred to the feedback capacitor causing the amplifier output to change its voltage to an amplitude proportional to the original input charge. This height is what is used to estimate the energy. In order to allow the shaping unit to process forthcoming impinging photos, the feedback capacitor is required to discharge. To this end a feedback discharge unit is used, such as, e.g., a feedback resistor. Such a resistor will discharge the capacitor. Other examples for a discharge unit (such as, e.g., a feedback current source) are disclosed herein below.

The detection device is preferably a photon counting detection device (also known as energy discriminating photon counting detection device), i.e., a detection device that energy discriminates the detected photons into one or more energy intervals and that provides for each energy interval a count representing the number of detected photons having an energy that falls into the respective energy interval. Such detection devices are used, for example, in medical imaging systems, such as medical computed tomography (CT) systems, medical positron emission tomography (PET) systems, or medical single photon emission computed tomography (SPECT) systems.

A typical detection device comprises a plurality of pixels, each pixel comprising the pre-amplifying unit and the shaping unit. In order to correct for different transient responses, it is therefore desirable that for each pixel the shaping unit comprises a feedback discharge unit and a feedback discharge control unit, so that the value of the feedback discharge unit can be adjusted simultaneously in all pixels.

The radiation source can be, for example, an X-ray tube or a similar device, a source of gamma radiation, such as a gamma emitting radionuclide, or a positron emitting radionuclide. The radiation source may also be a poly-energetic radiation source, i.e., a radiation source that emits photons at two or more energy levels.

In an embodiment of the invention, the detection device further comprises an energy determination unit for determining the energy of a detected photon depending on the electrical pulse. The energy determination unit is preferably an energy discrimination unit that energy discriminates the detected photons into one or more energy intervals such that for each energy interval a count representing the number of detected photons having an energy that falls into the respective energy interval can be provided by the detection device.

In a further embodiment of the invention, the energy determination unit is adapted to determine the energy of a detected photon by comparing the electrical pulse to one or more energy comparison values. A simple and straightforward implementation of the energy determination unit is the use of predefined energy comparison values, which may, e.g., correspond to the expected pulse amplitude for a given impinging photon energy.

In a further embodiment of the invention, the energy determination unit comprises one or more comparators. As noted herein above, a simple and straightforward implementation of the energy determination unit is the use of predefined energy comparison values. These predefined energy comparison values may be respectively assigned to comparators, which determine whether the pulse amplitude is above the respective threshold or not.

In a further embodiment of the invention, a first comparator of the one or more comparators is adapted to compare the electrical pulse to a first energy comparison value. The first comparator is adapted to output a first logic signal if the electrical pulse is smaller than the first energy comparison value. The comparator is adapted to output a second logic signal if the electrical pulse is equal to or larger than the first energy comparison value. For instance, the first energy comparison value may be set in correspondence with the pulse amplitude expected from the impinging photon energy, if no ballistic deficit were present. Since however, ballistic deficits are present, in that case, the pulse amplitude would most likely be too small to exceed the first energy comparison value. Therefore, the first comparator may output a first logic signal. The first logic signal indicates that the pulse amplitude is too small. In response, the feedback discharge control unit may adjust the feedback discharge unit value.

In a further embodiment of the invention, the feedback discharge control unit is adapted to increase the resistance of a feedback resistor if the electrical pulse is smaller than the one or more energy comparison values. By increasing the feedback resistor value, the amplitude of the pulse generated by the shaping unit increases as well. Namely, when a current transient occurs (or step response if using a preamplifier), the corresponding charge is transferred to a feedback capacitor causing the amplifier output to change its voltage to an amplitude proportional to the original input charge. This height is what is used to estimate the energy. In order to allow the shaper to process forthcoming impinging photons, the feedback capacitor is required to discharge. To this end a feedback resistor is used. Such a resistor will discharge the capacitor. Since this discharge is in place whenever a charge in the capacitor is present, it means that discharge already occurs before the output has reached its theoretical maximum ($V=Q/C$). Therefore, one may talk about ballistic deficit due to early discharge. The lower the resistor the faster the shaper will be ready for a new pulse, but the higher the ballistic deficit. Thus, by adjusting the feedback resistor value, the feedback discharge control unit may affect the pulse amplitude output by the shaping unit such that the pulse amplitude may ultimately exceed the first energy comparison value.

In a further aspect of the invention, there is provided a detection device for detecting photons emitted by a radiation source and capable of adjusting ballistic deficit, the detection device comprising a pre-amplifying unit adapted to convert a charge pulse generated by a photon into an electrical signal, a shaping unit adapted to convert the electrical signal into an electrical pulse. The shaping unit comprises a feedback current source. A value of the feedback current source is adjustable. The detection device further comprises a feedback current source control unit coupled to the feedback current source. The feedback current source control unit is adapted to adjust the value of the feedback current source depending on the electrical pulse. In other words, the feedback resistor of the first aspect of the invention may be replaced by a current source, which is preferably constant, i.e. the shaper feedback capacitor is discharged at constant current. The present invention is also applicable to this shaper topology, where the control unit can control the value of the constant current instead of a feedback resistor. The higher the constant current the larger the ballistic deficit (low resulting output voltage).

In an embodiment of the invention, the feedback discharge control unit is coupled to the energy determination unit such that the feedback discharge control unit is configured to receive at least one logic signal. The at least one logic signal may, e.g., indicate whether the pulse amplitude is smaller or not smaller than a first energy comparison value. By forwarding the at least one logic signal to the feedback discharge control unit, the feedback discharge control unit may decide whether to increase, decrease, or maintain the current feedback resistor value.

In a further embodiment of the invention, the feedback discharge control unit is coupled to receive one of the first or second logic signals. The feedback discharge control unit is adapted to cause an increase of the resistance of the feedback resistor upon receipt of the first logic signal. The feedback discharge control unit is adapted to cause maintaining the resistance of the feedback resistor upon receipt of the second logic signal. As noted herein above, by increasing the feedback resistor value, the feedback discharge control unit may affect an increase in the amplitude of the pulse output by the shaping unit. Alternatively and/or additionally, the feedback discharge control unit may affect an increase of a feedback current generated by a feedback current source.

In a further embodiment of the invention, upon startup, the feedback discharge control unit is adapted to cause the resistance of the feedback resistor to assume a predetermined initial value. Alternatively and/or additionally, the feedback discharge control unit is adapted to cause a current generated by the feedback current source to assume a predetermined initial value. The predetermined initial value may, e.g., correspond to the value expected for a given energy of an impinging photon (e.g., as determined by the radiation source). Due to the presence of ballistic deficit, the pulse generated by the shaping unit will have an amplitude too small to cause a comparator in the energy determination unit to trip. Thus, the feedback control unit may subsequently increase the feedback resistor value (or the feedback current value) until the pulse amplitude is large enough, thereby compensating ballistic deficit across pixels to at least some extent. Control may also be performed by external configuration, it does not necessarily need to be an "automatic mode", where the feedback resistor value (or the feedback current value) is automatically increased.

In a further embodiment of the invention, the pre-amplifying unit comprises a charge-sensitive amplifier. In a further aspect of the invention, the feedback discharge unit is connected to an input of the shaping unit and to an output of the shaping unit.

In a further aspect of the invention, a system comprises a detection device and a radiation source radiating photons of a predetermined energy and is capable of adjusting ballistic deficit. The radiation source can be, for example, an X-ray tube or a similar device, a source of gamma radiation, such as a gamma emitting radionuclide, or a positron emitting radionuclide. The radiation source may also be a poly-energetic radiation source, i.e., radiation source that emits photons at two or more energy levels. By choosing a radiation source radiating photons of a predetermined energy, a well-defined calibration procedure may be carried out, because the energy threshold(s) used in the energy determination unit may be chosen to correspond to the pulse amplitude expected in view of the predetermined energy.

In an embodiment of the invention, the apparatus further comprises an energy determination unit for determining the energy of a detected photon depending on the electrical pulse. The energy determination unit comprises one or more comparators having respective thresholds. Upon startup, the threshold of a first comparator of the one or more comparators is set to a value corresponding to the predetermined energy of said photons. By setting the threshold of a first comparator of the one or more comparators to a value corresponding to the predetermined energy of said photons, the feedback resistor value may be stepwise increased to identify the resistance sufficient to compensate for ballistic deficits. Alternatively and/or additionally, by setting the threshold of a first comparator of the one or more comparators to a value corresponding to the predetermined energy of said photons, the feedback current source value may be stepwise increased to identify the feedback current sufficient to compensate for ballistic deficits.

In a further aspect of the invention, there is provided a detection method for detecting photons emitted by a radiation source by a detection device, the detection method being capable of adjusting ballistic deficit and comprising: providing a pre-amplifying unit adapted to convert a charge pulse generated by a photon into an electrical signal, providing a shaping unit adapted to convert the electrical signal into an electrical pulse, wherein the shaping unit comprises a feedback discharge unit, wherein a parameter of the feedback discharge unit is adjustable, and adjusting the parameter of the feedback discharge unit if the electrical pulse does not exceed at least one energy comparison value, and maintaining the parameter of the feedback discharge unit if the electrical pulse exceeds the at least one energy comparison value. In an embodiment, adjusting the parameter of the feedback discharge unit is carried out iteratively until the amplitude of the electrical pulse is large enough to, e.g., cause one of the comparators in the energy determination unit to trip.

In a further aspect of the invention, there is provided a calibration method capable of adjusting ballistic deficit. The calibration method comprises emitting photons of a predetermined energy by a radiation source, and detecting photons emitted by the radiation source by a detection method according to the invention, wherein adjusting the parameter of the feedback discharge unit comprises comparing the electrical pulse to at least one energy comparison value. The calibration method further comprises the step of increasing the resistance of the feedback resistor if the electrical pulse does not exceed the at least one energy comparison value. Alternatively and/or additionally, the calibration method further comprises the step of increasing the feedback current generated by the feedback discharge unit if the electrical pulse does not exceed the at least one energy comparison value. Preferably, the at least one energy comparison value corresponds to the expected pulse amplitude. Namely, it is proposed to compensate differences of ballistic deficits across pixels. For example, a 100 keV photon may cause a 100 mV pulse to a nominal 10 ns input (this already includes a certain amount of ballistic deficit). A pixel showing 90 mV instead of 100 mV indicates (among other artefacts) that this particular pixel suffers from more ballistic deficit than other pixels and the feedback resistor (or the feedback current source) can be adjusted to compensate therefore. By setting the at least one energy comparison value to a value corresponding to the predetermined energy of the photons, the feedback resistor value may be stepwise increased to identify the resistance sufficient to compensate for ballistic deficits. Alternatively and/or additionally, by setting the at least one energy comparison value a value corresponding to the predetermined energy of the photons, the feedback current source value may be stepwise increased to identify the feedback current sufficient to compensate for ballistic deficits. The calibration method is feasible as "factory calibration" or servicing to determine the particular per-pixel ASIC parameter configuration that fits best with the characteristics of each pixel of the (permanently) mounted CZT crystal.

It shall be understood that the detection device of claim 1, the system of claim 12, the detection method of claim 14, and the calibration method of claim 15 have similar and/or identical preferred embodiments as defined in the dependent claims.

It shall be understood that a preferred embodiment of the invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Figure 1:
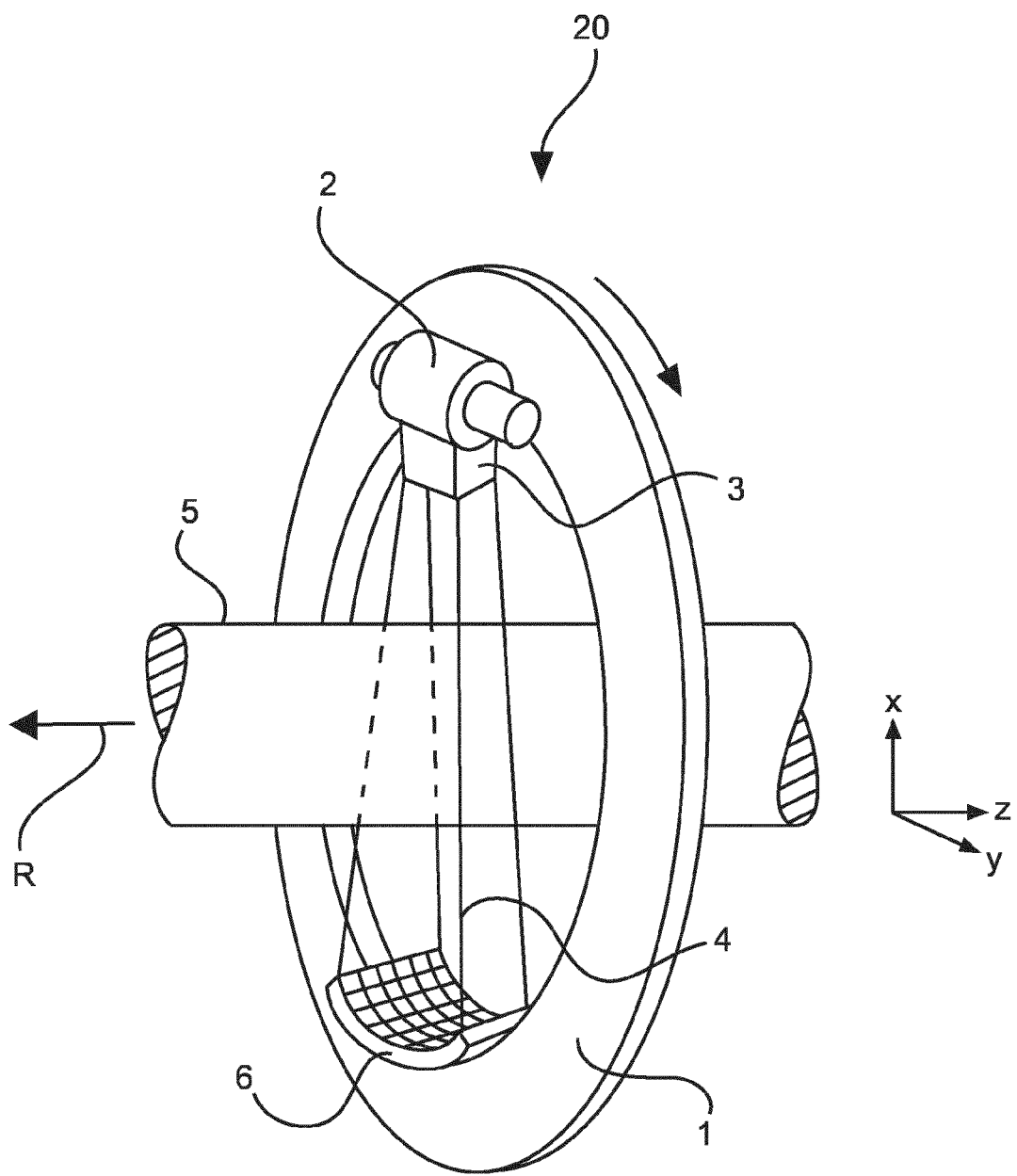
FIG. 1 shows schematically and exemplarily an embodiment of a projection data generation system.

FIG. 1 shows schematically and exemplarily an embodiment of a projection data generation system 20 for generating projection data of an object. In this embodiment the projection data generation system is a computed tomography system. The computed tomography system 20 includes a gantry 1, i.e. a rotor, which is capable of rotation with respect to a stator (not shown in FIG. 1) about a rotational axis R, which extends parallel to the z direction. A radiation source 2 being, in this embodiment, an x-ray tube is mounted on the gantry 1. The radiation source 2 is provided with a collimator 3, which forms, in this embodiment, a conical radiation beam 4 from the radiation generated by the radiation source 2. The radiation traverses the object (not shown), such as a patient, in an examination zone 5. After having traversed the examination zone 5 the radiation beam 4 is incident on a detector 6 mounted on the gantry 1.

The detector 6 is adapted to generate a detection signal depending on the detected radiation and to generate the projection data, i.e. detection values, depending on the generated detection signal. While detecting the radiation the gantry 1 rotates around the examination zone 5 such that the projection data can be acquired in different acquisition directions.

Figure 2A:
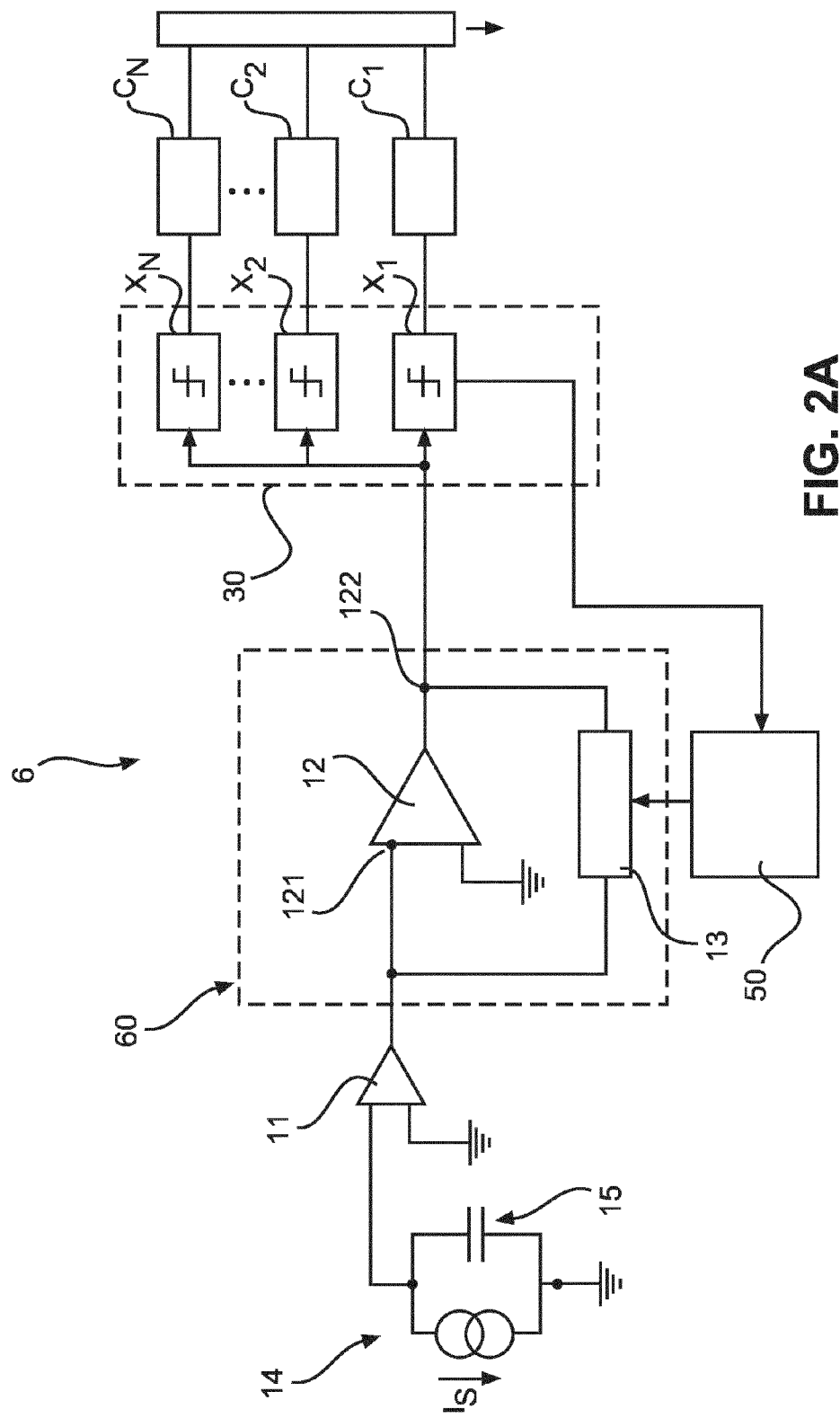
FIGS. 2A-2C show schematically and exemplarily embodiments of a detection device for detecting photons emitted by a radiation source.
Figure 2B:
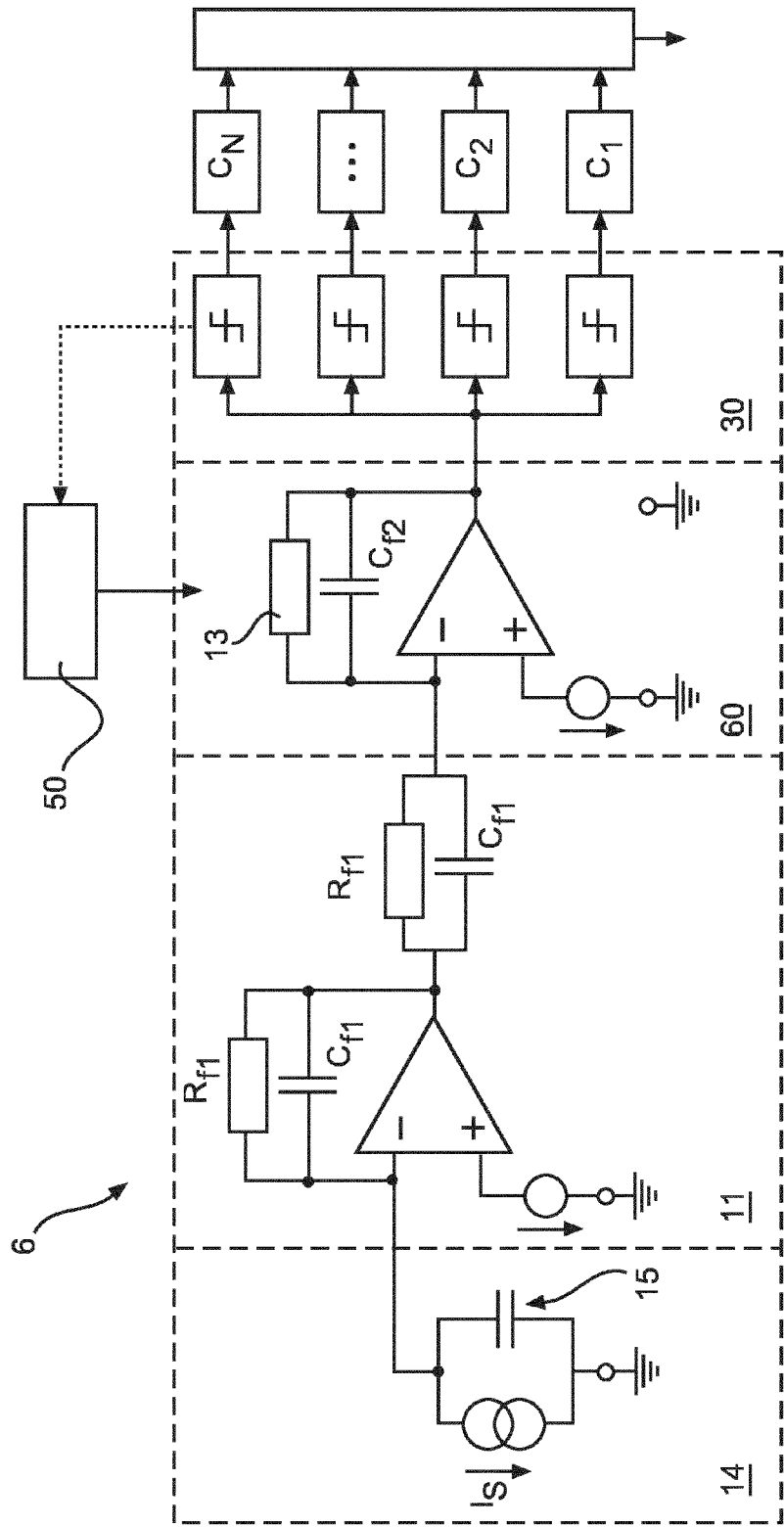
Figure 2C:
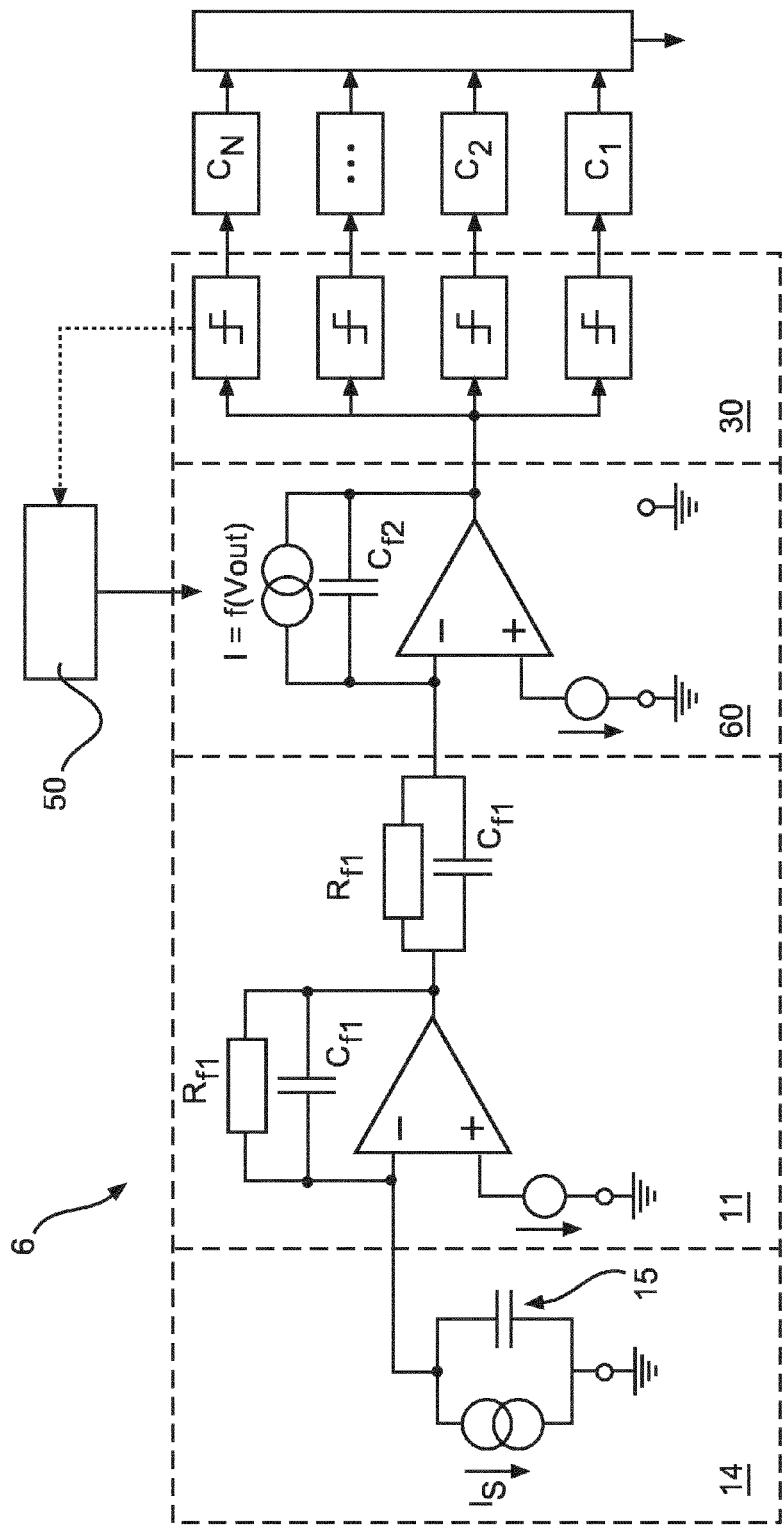

FIGS. 2A-2C show schematically and exemplarily an embodiment of a detection device 6 for detecting photons emitted by a radiation source 2 (as shown, for example, with reference to FIG. 1). The detection device 6, which, in this embodiment, is a photon counting detection device, comprises a plurality of pixels each including a radiation sensitive sensor 14. The radiation sensitive sensor 14 of a pixel detects photons emitted by a radiation source 2 and generates a corresponding electrical signal, such as an electrical current or voltage signal, for each detected photon. Examples of suitable sensor types include direct conversion sensors, such as cadmium zinc telluride (CZT) based sensors. Other suitable sensor types are scintillator based sensors that include a scintillator in optical communication with a photosensor. The electrical signal generated by the radiation sensitive sensor 14, in this embodiment, an electrical current signal $I_S$, is passed to a pre-amplifying unit 11 (such as, e.g., a charge-sensitive amplifier) of the pixel, which converts a charge pulse generated by a photon into an electrical signal. The radiation sensitive sensor 14, in this embodiment, is coupled to the pulse pre-amplifying unit 11 (such as, e.g., a charge-sensitive amplifier) by means of a coupling capacitor 15. In other embodiments, DC coupling can be used, resulting in both the DC and the AC portion of the electrical current $I_S$ being passed to the pre-amplifying unit 11 (such as, e.g., a charge-sensitive amplifier). The pre-amplifying unit 11 (such as, e.g., a charge-sensitive amplifier), in the embodiment of FIG. 2A, is implemented as an operational amplifier 11. In other embodiments (see FIGS. 2B and 2C), pre-amplifying unit 11 may comprise an operational amplifier, a feedback network of capacitor $C_{f1}$ and resistor $R_{f1}$, and/or a pole-zero cancellation circuit formed by capacitor $C_{f1}$ and resistor $R_{f1}$. Note that the symbols $R_{f1}C_{f1}$ on the CSA and zero-cancellation stage identify resistors and capacitors, which have the same resistance resp. capacitance. This is the essence of pole-zero cancellation, i.e. they are always both present. They could also be different provided that the equivalent time constant is the same. The figure reflects the typical implementation but alternatives are not excluded, particularly since these components are not essential to the invention.

The electrical signal generated by the pre-amplifying unit 11 (such as, e.g., a charge-sensitive amplifier) is passed to a shaping unit 60. Shaping unit 12 converts the electrical signal into an electrical pulse. In the embodiment of FIG. 2A, shaping unit 60 comprises an operation amplifier 12 and a feedback resistor 13. In another embodiment (see FIGS. 2B and 2C), shaping unit 60 also comprises a feedback capacitor $C_{f2}$ coupled in parallel to feedback resistor 13. In still another embodiment (see FIG. 2C), feedback resistor 13 is replaced by a (not necessarily constant) current source I=f(Vout). Note that current source I=f(Vout) may also be used in the embodiment of FIG. 2A, i.e., current source I=f(Vout) may also be combined with a circuit which does not include, e.g., resistor $R_{f1}$ and capacitor $C_{f1}$ in pre-amplifying unit 11. Operational amplifier 12 comprises an input 121 and an output 122. Operational amplifier 12 could also be implemented as differential amplifier, e.g., two inputs and one output or two inputs and two outputs. In this embodiment, the electrical signal generated by the pre-amplifying unit 11 is passed to input 121 of operation amplifier 12. Feedback resistor 13 is coupled between output 122 and input 121 of operational amplifier 12. Preferably, the resistance of feedback resistor 13 is adjustable, i.e., its value can be modified. Adjustment of the resistance of feedback resistor 13 may be carried out, e.g., by transmitting a logical signal indicating that the resistance of feedback resistor 13 shall be increased. Alternatively or additionally, adjustment of the resistance of feedback resistor 13 may be carried out, e.g., by transmitting a logical signal indicating that the resistance of feedback resistor 13 shall be decreased. In this embodiment, adjustment of the resistance of feedback resistor 13 is controlled by feedback discharge control unit 50 coupled to feedback resistor 13. Preferably, feedback discharge control unit 50 is adapted to adjust the resistance of feedback resistor 13. Alternatively, in the embodiment of FIG. 2C, feedback discharge control unit 50 is adapted to control the value of the current generated by current source I=f(Vout).

The electrical pulse generated by the shaping unit 12 is passed on to an energy determination unit 30 of the pixel which determines the energy of the detected photon. In this embodiment, the energy determination unit 30 is implemented as an energy discriminator which energy-discriminates the detection pulse signal by comparing its amplitude to one or more energy thresholds $X_1, X_2, \ldots, X_N$. For this purpose, energy determination unit 30 may comprise, in this embodiment, one or more comparators. Each of the one or more comparators carries out a comparison of the electrical pulse generated by shaping unit 60 to a respective energy threshold $X_1, X_2, \ldots, X_N$. If the detection pulse signal exceeds a respective energy threshold $X_1, X_2, \ldots, X_N$, a corresponding counter $C_1, C_2, \ldots, C_N$ is incremented and, at the end of a frame period, the number of counts corresponding to each respective energy interval is read-out from the counters $C_1, C_2, \ldots, C_N$ via read-out line 31.

At high energies, the energy resolution of photon spectrometers can be dominated by "ballistic deficit" effects, particularly when short processing times are used to permit high rate operation. This results from the fact that rise-time variations in the detector signal are reflected in amplitude fluctuations after the signals pass through pulse shapers.

In ultra-short channel lengths whose dimensions are on the order of or shorter than the mean free path, channel carriers do not suffer from scattering. They can gain energy from the field without losing it to the lattice through scattering, and can acquire a velocity much higher than the saturation velocity. This effect is called ballistic transport. The measurement of a signal produced by a semiconductor detector should ideally be a ballistic measurement resulting in an output reading proportional to the charge produced by a radiation event in the detector. This reading should be independent of the charge collection time in the detector. Such a result can be accomplished if the measurement is made in a very long time compared with the detector charge collection time, but the measurement time in a spectrometer is normally limited by the need to process signal pulses occurring at random times and at relatively high rates. Furthermore, parallel noise increases if long processing times are used. Consequently, the pulse shaping circuits used in spectrometers are designed to produce output pulses whose total duration is usually limited to a few nanoseconds (in CT applications) or microseconds (in other applications) and the peak amplitude of the output pulse, which occurs at a time less than half the pulse width, is used as a measure of the input charge signal from the detector. For CZT detectors, charge collection times fluctuate between events (depending on the location of interactions) and may approach 1 μs. Consequently, the conditions for a ballistic measurement are not satisfied and "ballistic deficit" effects occur. The interaction location may affect the transient response. However, in computed tomography (CT), typical pixel sizes are very small (sub-mm) while materials are relatively thick (2-3 mm). This makes use of the so-called small-pixel effect. Accordingly, the transient response is rather uniform unless the interaction occurs very close to the anode. Yet, due to inhomogeneities of the crystal, the electric field may be distorted to the extent of creating different responses for different pixels, which is what the present invention strives to compensate. In such geometries, the transient responses is expected to be in the range of a few 10 ns (e.g., 10-30 ns).

As a result of these "ballistic deficit" effects, the fluctuations in the detector charge signal rise time are reflected in fluctuations in the peak amplitude of the output signal from the pulse shaper. Under some circumstances these ballistic deficit fluctuations can be a major or dominant contributor limiting resolution. One approach to correct for "ballistic deficit" effects in semiconductor detector spectrometers is described in F. S. Goulding and D. A. Landis, *Ballistic Deficit Correction in Semiconductor Detector Spectrometers*, IEEE Trans. Nucl. Sci., Vol. 35, No. 1, 1988.

This invention proposes tuning the application-specific integrated circuit (ASIC) operating point in order to adjust the ballistic deficit to a predefined expected value such that the spread of photo peak amplitudes across the array is already corrected to some extent. Feedback resistor 13 (or feedback current source I) of shaping unit 60 is responsible for the ballistic deficit. The preferred value of feedback resistor 13 may then be determined by iteratively evaluating if the shaper amplitude (i.e., the amplitude of the electrical pulse generated by shaping unit 60) is sufficient to cause one of the comparators of energy determination unit 30 to trip. The comparators may be set to predefined values corresponding to the expected position of the photo-peak in the energy domain of radiation source 2.

This invention relates to modifying the shaper operating point of every individual pixel by means of its feedback resistor 13 (or feedback current source I) in order to adapt the ballistic deficit to the transient response of any given Cadmium zinc telluride (CZT) pixel.

Pixels exhibiting different transient responses to impinging photons of a given energy, will cause a shaper signal amplitude difference related to the ballistic deficit properties, i.e. a pixel capable of delivering 10 ns pulses (that is, a pixel delivering a pulse with a full width of 10 ns) will deliver a larger amplitude at the shaper output than a pixel delivering 20 ns (that is, a pixel delivering a pulse with a full width of 20 ns), assuming that both shapers are operating at the same settings. The attribute "10 ns" may refer to the time where e.g. 95% of the charge is delivered. Then, it is the transient time where most of the energy is detected.

It is proposed to tune the resistance value of feedback resistor 13 iteratively while irradiating detector 6 with a radioactive source 2 (e.g. $^{241}$Am or $^{57}$Co) or with an X-ray tube 2 in conjunction with a K-edge filter. In a similar manner, it is possible to tune the feedback current value of feedback current source I iteratively while irradiating detector 6 with a radioactive source 2 (e.g. $^{241}$Am or $^{57}$Co) or with an X-ray tube 2 in conjunction with a K-edge filter. Starting with a low equivalent resistor value (maximum ballistic deficit), the resistor value is increased in successive steps until the output of shaping unit 60 is sufficiently high to cause a comparator of energy determination unit 30 to trip (i.e. a number of valid counts is observed within a time interval). For example, assume that by design it is expected that a 60 keV X-ray photon causes an amplitude of the electrical pulse generated by shaping unit 60 of 100 mV. The comparator threshold would then be set, e.g. to 100 mV. At the lowest value of feedback resistor 13 (or of feedback current source I), shaping unit 60 will unlikely produce sufficient amplitude, since the ballistic deficit is much too high. Once the value of feedback resistor 13 (or of feedback current source I) is sufficiently high, a comparator in energy determination unit 30 will start providing valid counts for each impinging photon. A "low-energy tail" related to collected charges which are lower than the expected 60 keV due to a number of artifacts (e.g. Charge sharing, k-fluorescence from neighboring pixels, partial collection (when photo interacts very close to the anode), . . . ) does not pose problems here: Valid counts would only be achieved with photon interactions, which reach the photo-peak energy (e.g., 60 keV in case of $^{241}$Am). At this point the value of feedback resistor 13 (or of feedback current source I) is fixed (and stored) for this given pixel. The resistance value of feedback resistor 13 (or the current value of feedback current source I) may be stored, e.g., in feedback discharge control unit 50.

Figure 3:
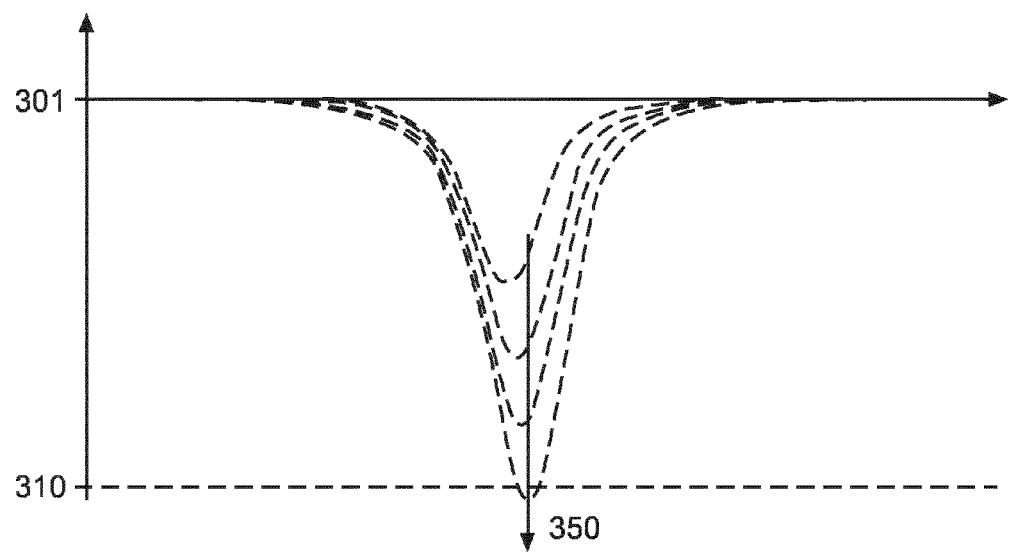
FIG. 3 shows schematically and exemplarily the effect of the feedback resistor on the shaper output.

FIG. 3 shows conceptually how the amplitude of the electrical pulse generated by shaping unit 60 changes with increasing values of feedback resistor 13 (or of feedback current source I). An electrical pulse generated by shaping unit 60 is shown with respect to baseline 301. A predefined threshold 310 has been chosen in energy determination unit 30, e.g. corresponding to the energy of the impinging photons. Reference numeral 350 illustrates the effect of increasing resistance values of feedback resistor 13 (or of feedback current source I). The solid line corresponds to the value of feedback resistor 13 (or of feedback current source I), which exceeds predefined threshold 310. That value of feedback resistor 13 (or of feedback current source I) would then be chosen as a preferred value to calibrate for the influence of ballistic deficits.

On a pixelated array the procedure can run simultaneously for all pixels. The iterative process of adjusting feedback resistor 13 (or feedback current source I) can be implemented within the application-specific integrated circuit (ASIC) itself by means of a simple state-machine and some logic. Alternatively, this procedure can also be implemented externally by e.g. a field-programmable gate array (FPGA) with access to the internal application-specific integrated circuit (ASIC) settings.

Figure 4:
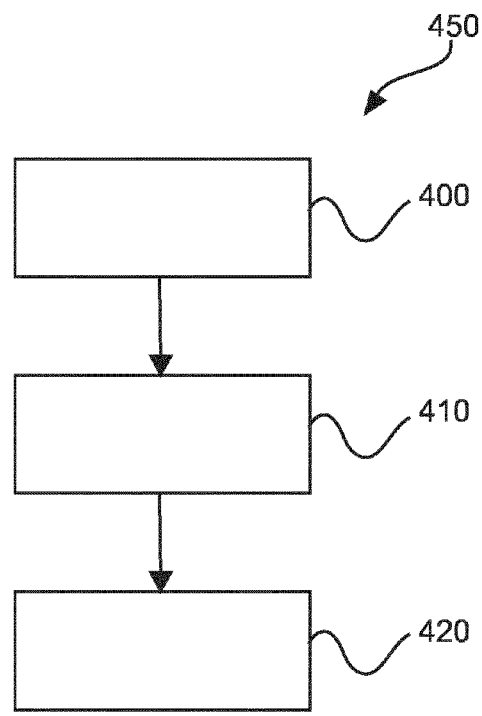
FIG. 4 shows schematically and exemplarily an embodiment of a detection method.

FIG. 4 shows schematically and exemplarily an embodiment of a detection method 450 for detecting photons emitted by a radiation source 2 by a detection device 6. In a first step 400, a pre-amplifying unit 11 is provided. Pre-amplifying unit 11 is adapted to convert a charge pulse generated by a photon into an electrical signal. In a further step 410, a shaping unit 60 is provided. Shaping unit 60 is adapted to convert the electrical signal into an electrical pulse. Shaping unit 60 comprises a feedback resistor 13 (or a feedback current source I). A resistance of feedback resistor 13 or a feedback current of feedback current source I is adjustable. A further step 420 relates to adjusting the resistance of feedback resistor 13 (or the current value of feedback current source I) depending on the electrical pulse.

Figure 5:
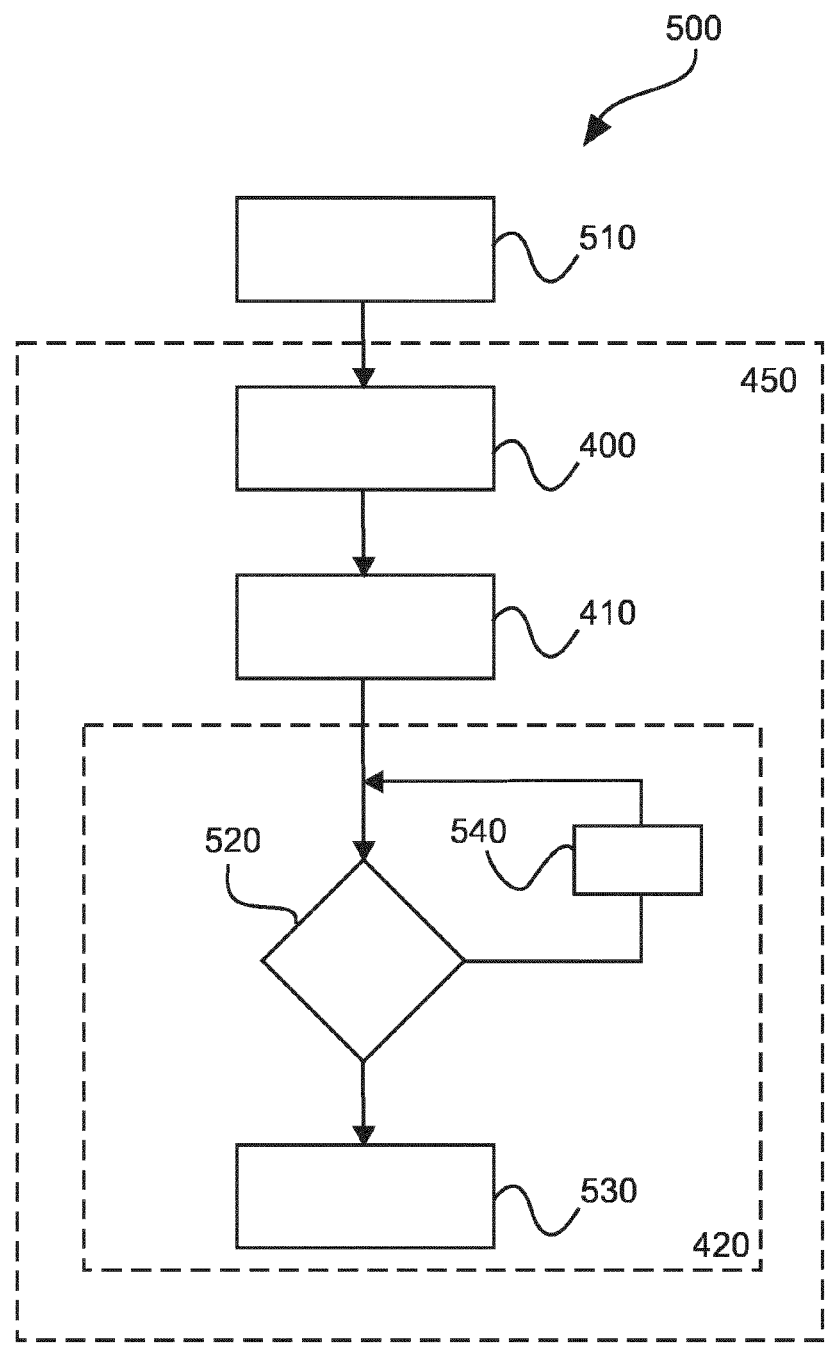
FIG. 5 shows schematically and exemplarily an embodiment of a calibration method.

FIG. 5 shows schematically and exemplarily an embodiment of a calibration method 500. In a first step 510, calibration method 500 comprises emitting photons of a predetermined energy by a radiation source 2. In a further step, calibration method 500 comprises detecting photons emitted by radiation source 2 by detection method 450 comprising steps 400, 410, and 420 as explained herein above. As to step 420, calibration method 500 further includes the steps of comparing 520 the electrical pulse to at least one energy comparison value, and increasing 540 the resistance of feedback resistor 13 (and/or increasing the feedback current of feedback current source I) if the electrical pulse does not exceed the at least one energy comparison value. Additionally or alternatively, calibration method 500 may comprises a step 530 storing the resistance of feedback resistor 13 (or the current value of feedback current source I) if the electrical pulse exceeds the at least one energy comparison value.

Although in this invention we primarily disclose adjusting the value of feedback resistor 13 (or of feedback current source I), similar procedures can be put in place to adjust other parameters within the application-specific integrated circuit (ASIC).

Typically a cadmium zinc telluride (CZT) array is associated to an application-specific integrated circuit (ASIC) (i.e., they are permanently assembled together). Namely, CZT array and ASIC are bonded using any available bonding process, e.g. stud-bumping, soldering, conductive epoxy, . . . . However, the present invention is not restricted to bonding the CZT array and the ASIC together. One could imagine a test system where the sensor is not permanently bonded where such a pre-calibration could also be applied. Therefore, this calibration procedure with a radioactive source is feasible as "factory calibration" or servicing to determine the particular per-pixel application-specific integrated circuit (ASIC) parameter configuration that fits best with the characteristics of each pixel of the (permanently) mounted cadmium zinc telluride (CZT) crystal. For routine use of the detector, threshold calibrations using threshold scans would still be applied.

It should be noted that the calibration of feedback resistor 13 (or of feedback current source I) (or other application-specific integrated circuit (ASIC) configuration parameters) reasonably can only compensate for smaller differences between cadmium zinc telluride (CZT) crystal pixels, since a larger feedback resistor 13 (or feedback current source I) to compensate for a longer cadmium zinc telluride (CZT) signal rise-time, which will result in a larger ballistic deficit, entails a longer total output pulse duration of shaping unit 60, thus limiting the supported maximum count rate of the considered pixel. Too large variations in the supported pixel count rate across a detector should be avoided, but are not necessarily out of the question.

An example application of the invention is spectral CT applications, but the invention is also applicable to circuits of similar functionality in other applications.

Although in the above described embodiments the energy determination unit is shown comprising one or more comparators, these embodiments are preferred embodiments only and in another embodiment the energy determination unit can comprise other means to determine the pulse energy. Since the above described embodiments comprise means to detect if the peak has reached a predefined level, other topologies could also be used, such as, e.g., a full spectrometer having several hundreds of discriminators or a system based on ADC (i.e. pulse analysis) as a digitized shaper output.

Although in some of the above described embodiments the shaping unit is shown comprising an operational amplifier, a feedback capacitor and a feedback resistor (or feedback current source I), where the feedback capacitor and the feedback resistor (or feedback current source I) are coupled between the operation amplifier output and input in a feedback loop, these embodiments are preferred embodiments only and in another embodiment the shaping unit can comprise other units to convert the electrical signal from the pre-amplifying unit. Namely, a shaping unit could also be embodied by a passive network of capacitor and resistance.

The simplest shaper is a CR-RC circuit (high pass-low pass network). The value of the RC could also be changed to the same effect. This also applies to high order CR-RC networks.

Although in the above described embodiments the pre-amplifying unit is shown comprising an operational amplifier, these embodiments are preferred embodiments only and in another embodiment the pre-amplifying unit can comprise other units to convert the charge pulse generated by a photon into an electrical signal. In particular, it is possible to implement a shaper only (i.e., without preamplification). A charge-sensitive amplifier (CSA) is typically used to couple a relatively high input capacitance with a relatively low shaper capacitance (for stability reasons). Topologies without charge-sensitive amplifiers are known to those skilled in the art.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

Determinations like determining the energy of a detected photon et cetera performed by one or several units or devices can be performed by any other number of units or devices. For example, the determination of whether the electrical pulse generated by the shaping unit exceeds a predefined energy comparison value or not can be performed by a single unit of by any other number of different units. The determinations and/or the control of the feedback resistor (or of the feedback current source) in accordance with the above described feedback discharge control unit and in accordance with the above described detection and calibration methods can be implemented as program code means of a computer program and/or as dedicated hardware.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The present invention relates to a detection device for detecting photons emitted by a radiation source and capable of adjusting ballistic deficit. The detection device comprises a pre-amplifying unit (such as, e.g., a charge-sensitive amplifier), a shaping unit comprising a feedback discharge unit (such as, e.g., a feedback resistor or a feedback current source), and a feedback discharge control unit coupled to the feedback discharge unit. The feedback discharge control unit is adapted to adjust a resistance of the feedback resistor (and/or to adjust a current value of the feedback current source) if an electrical pulse generated by the shaping unit does not exceed at least one energy comparison value. The feedback discharge control unit is adapted to not adjust the parameter of the feedback discharge unit if the electrical pulse exceeds the at least one energy comparison value. By tuning the feedback resistor operating point (or the feedback current source operating point), the ballistic deficit can be adjusted to a predefined expected value.

The invention claimed is:

1. A detection device for detecting photons emitted by a radiation source and capable of adjusting ballistic deficit, the detection device comprising
    a pre-amplifying unit adapted to convert a charge pulse generated by a photon into an electrical signal, and
    a shaping unit adapted to convert the electrical signal into an electrical pulse, wherein the shaping unit comprises a feedback discharge unit, wherein a parameter of the feedback discharge unit is adjustable,
    wherein the detection device further comprises a feedback discharge control unit coupled to the feedback discharge unit, wherein the feedback discharge control unit is adapted to adjust the parameter of the feedback discharge unit if the electrical pulse does not exceed at least one energy comparison value,
    wherein the feedback discharge control unit is adapted to not adjust the parameter of the feedback discharge unit if the electrical pulse exceeds the at least one energy comparison value.

2. The detection device according to claim 1, wherein the feedback discharge unit comprises a feedback resistor, wherein the feedback discharge control unit is adapted to adjust the resistance of the feedback resistor depending on the electrical pulse.

3. The detection device according to claim 1, wherein the feedback discharge unit comprises a feedback current source, wherein the feedback discharge control unit is adapted to adjust a current generated by the feedback current source depending on the electrical pulse.

4. The detection device according to claim 1, wherein the detection device further comprises an energy determination unit for determining the energy of a detected photon depending on the electrical pulse.

5. The detection device according to claim 4, wherein the energy determination unit is adapted to determine the energy of a detected photon by comparing the electrical pulse to the one or more energy comparison values.

6. The detection device according to claim 4, wherein the energy determination unit comprises one or more comparators.

7. The detection device according to claim 2, wherein the detection device further comprises an energy determination unit for determining the energy of a detected photon depending on the electrical pulse, wherein the energy determination unit is adapted to determine the energy of a detected photon by comparing the electrical pulse to one or more energy comparison values, and wherein the feedback discharge control unit is adapted to increase the resistance of the feedback resistor if the electrical pulse is smaller than the one or more energy comparison values.

8. The detection device according to claim 4, wherein the feedback discharge control unit is coupled to the energy determination unit such that the feedback discharge control unit is configured to receive at least one logic signal.

9. The detection device according to claim 2, wherein, upon startup, the feedback discharge control unit is adapted to cause the resistance of the feedback resistor to assume a predetermined initial value.

10. The detection device according to claim 1, wherein the pre-amplifying unit comprises a charge-sensitive amplifier.

11. The detection device according to claim 2, wherein the feedback resistor is connected to an input of the shaping unit and to an output of the shaping unit.

12. A system capable of adjusting ballistic deficit comprising
a detection device according to claim 1, and
a radiation source radiating photons of a predetermined energy.

13. The system according to claim 12, wherein the detection device further comprises an energy determination unit for determining the energy of a detected photon depending on the electrical pulse,
wherein the energy determination unit comprises one or more comparators having respective thresholds,
wherein, upon startup, a first threshold of a first comparator of the one or more comparators is set to a value corresponding to the predetermined energy of said photons.

14. A detection method for detecting photons emitted by a radiation source by a detection device, the detection method being capable of adjusting ballistic deficit and comprising:
providing a pre-amplifying unit adapted to convert a charge pulse generated by a photon into an electrical signal,
providing a shaping unit adapted to convert the electrical signal into an electrical pulse, wherein the shaping unit comprises a feedback discharge unit, wherein a parameter of the feedback discharge unit is adjustable,
adjusting the parameter of the feedback discharge unit if the electrical pulse does not exceed at least one energy comparison value, and
maintaining the parameter of the feedback discharge unit if the electrical pulse exceeds the at least one energy comparison value.

15. A calibration method capable of adjusting ballistic deficit, the calibration method comprising:
emitting photons of a predetermined energy by a radiation source,
detecting photons emitted by the radiation source by a detection method as defined in claim 14,
wherein adjusting the parameter of the feedback discharge unit comprises: comparing the electrical pulse to at least one energy comparison value, and, if the electrical pulse does not exceed the at least one energy comparison value, increasing the resistance of a feedback resistor and/or increasing a current value of a current source.

\* \* \* \* \*